L. C. PERCIVAL.
Velocipede.
No. 50,078.  Patented Sept. 19, 1865.
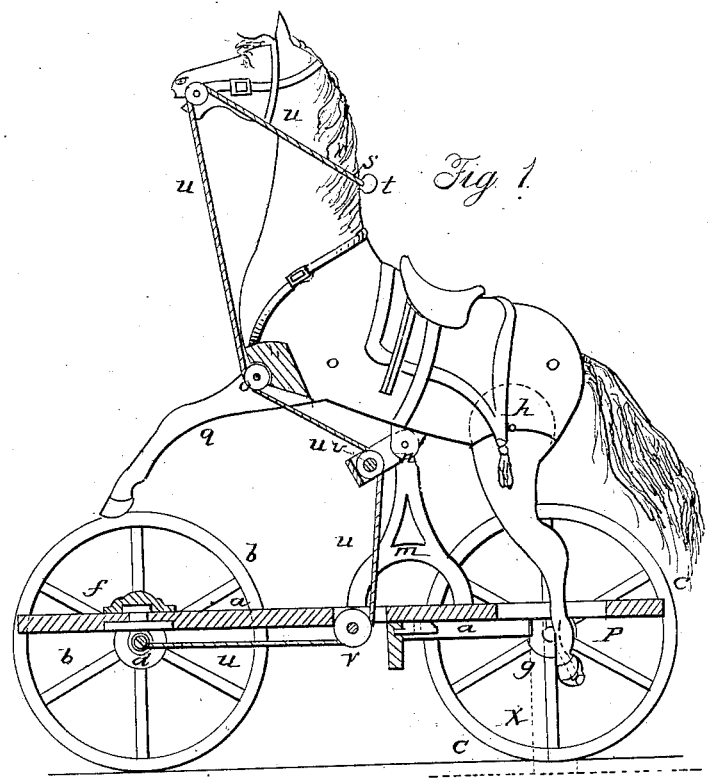
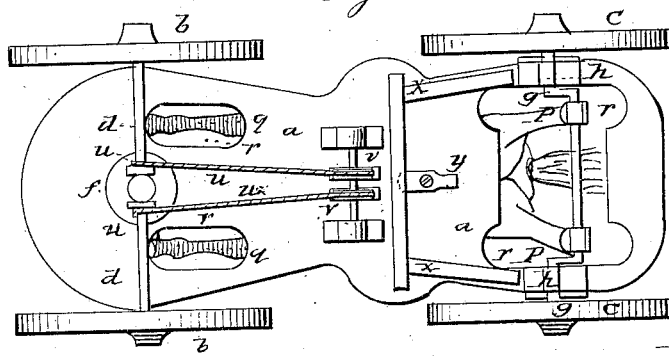

UNITED STATES PATENT OFFICE.

LEVEN C. PERCIVAL, OF PHILADELPHIA, PENNSYLVANIA, ASSIGNOR TO HIMSELF AND E. H. DEEMER, OF SAME PLACE.

ROCKING-HORSE.

Specification forming part of Letters Patent No. 50,078, dated September 19, 1865.

*To all whom it may concern:*

Be it known that I, LEVEN C. PERCIVAL, of Philadelphia, in the county of Philadelphia and State of Pennsylvania, have invented a new and useful Improvement in Rocking-Horses; and I do hereby declare that the following is a full, clear, and exact description thereof, which will enable others skilled in the art to make and use the same, reference being had to the accompanying drawings, forming part of this specification.

The present invention consists in hanging by a pivot to and upon the upper end of a standard of a platform, placed upon wheels at its two ends, the under side of a wooden model made of the form of a horse, and at or near its center, the hind legs of which are hung at their lower extremities to and upon a crank of the rear axle-shaft, while the fore legs are free, so that the child or other person, when sitting upon the horse, by alternately leaning or bending forward and backward, or, in other words, rocking upon its standard, the platform will be propelled and caused to travel over the surface of the ground on which it is placed at pleasure and with any desired speed.

In order to enable the platform while being thus propelled to be guided according as it may be desired to move in this or that direction, I have also arranged upon the horse, and in proper position thereon to be easily reached and operated by the rider, cords or reins passing over suitable pulleys thereof and of the platform, and connected to the front axle-shaft, hung at its center by a pivot to the platform, so as to freely turn thereon, by the pulling of which cords the front wheels can be changed in position and direction at pleasure with regard to the platform, thus causing the platform to move in any direction at pleasure. I also have attached to the under side of the platform a swinging frame, which, when turned down so as to stand upon the ground, will sufficiently raise the rear end of the platform as to prevent its hind wheels from imparting motion thereto, whereby the rocking-horse can be used with its platform stationary if so desired.

In accompanying plate of drawings my improvements are illustrated, Figure 1 being a central longitudinal section of platform and side view of the rocking-horse, and Fig. 2 a view of the under side of the platform.

$a\ a$ in the drawings represent a horizontal platform or bed set upon wheels $b\ b$ and $c\ c$, the axle $d$ of the front wheels, $b\ b$, being hung at its center, in and to the under side of the front part of the platform, by a plate, $f$, so as to freely turn therein, whereby the wheels can be turned to any desired position and direction with regard to the platform. The axle $g$ of rear wheels, $c\ c$, turns at each end in fixed bearings $h\ h$ of the platform, and its central portion, $l$, is made in the form of a crank.

$m$ is a standard fixed upon the platform, in the upper end of which is hung, by a pivot-joint, $n$, a model, $o$, made of wood or any other suitable material and of the proper size, of a horse, the hind legs, $p\ p$, of which are hung upon the crank portion $l$ of rear axle-shaft, while the fore legs, $q\ q$, are free of the platform; $r\ r\ r$, apertures or openings made in platform to allow the play of the horse's legs through the same when it is rocked, as will be presently described.

The horse can be decorated in any suitable manner and be provided with such portions of harness as may be deemed desirable—such as, for instance, a saddle, stirrups, bridle, &c.

To and across the neck portion $s$ of the horse is fastened a rod, $t$, so as to be easily swung back and forth, to and from each outer end of which a cord or rein, $u$, is passed and connected with the front axle-shaft, upon each side of its center or turning-point, moving over and guided by a series of pulleys, $v\ v\ v$, &c., arranged at the proper positions upon the horse and platform therefor, as seen in Fig. 1, by the pulling of which cords the axle is turned either to the right or left upon its center, thus bringing its wheel to any direction desired.

In the use of the above-described rocking-horse the child or other person who is to ride sits upon the same in the usual manner, when by simply leaning or bending backward and forward alternately, or, in other words, causing the horse to rock on its standards, the rear wheels, connected therewith through its crank-shaft, necessarily are revolved, thereby causing the platform to travel and move along over the surface of the ground by its wheels, the speed of which can be increased or decreased at pleasure by simply quickening or slackening the rocking of the horse. When desired, as the platform is thus propelled, to change the direction in which it may be moving it is only necessary to turn the front wheels in the proper direction therefor by pulling the reins, as has been previously described.

The platform can be made to move backward as well as forward, if desired, it being only necessary to reverse the motion of the crank-shaft, which is easily and readily done, as is evident.

When desired to use the rocking-horse without having the platform move, I have attached for that purpose to the under side of the platform a swinging frame, $x$ $x$, of such a height that when turned down, as represented by red lines in Fig. 1, it will sufficiently raise the hind wheels from the ground or floor as to prevent them from coming in contact therewith as they revolve, thus keeping the platform stationary, the frame when not so desired to be used being swung up and held to the platform out of the way by a nut, $y$, or other proper device.

Having thus described my invention, I claim as new and desire to secure by Letters Patent—

1. The hobby-horse constructed substantially as denoted—that is to say, supported underneath by a pivotal attachment to a standard erected on the wheeled platform, the hind feet attached to the crank on the rear axle, while the forward parts are left free, substantially as described.

2. The guiding bridle-line, connecting from the bit to a place near the pivotal point of the horse, and from thence with the forward axle, as described.

3. The use of the swinging frame $x$ $x$ for lifting the platform, arranged as described, and for the purpose specified.

LEVEN C. PERCIVAL.

Witnesses:
SAML. F. FLOOD,
DANIEL SCULLION.